United States Patent [19]

Landingham

[11] 3,718,441
[45] Feb. 27, 1973

[54] METHOD FOR FORMING METAL-FILLED CERAMICS OF NEAR THEORETICAL DENSITY

[75] Inventor: Richard L. Landingham, Livermore, Calif.

[73] Assignee: The United States of America as represented by the Secretary of the Army

[22] Filed: Nov. 18, 1970

[21] Appl. No.: 90,795

[52] U.S. Cl..............29/182.1, 29/182.5, 106/39 R, 117/107, 117/119, 117/169, 264/62, 264/65, 264/332
[51] Int. Cl. ..............................................B44d 1/02
[58] Field of Search.....106/65, 66, 58, 39 R; 264/62, 264/65, 332, 200; 75/201, 204; 117/119; 29/182.1, 182.5, 182.8

[56] References Cited

UNITED STATES PATENTS

| | | |
|---|---|---|
| 2,691,955 | 3/1954 | Grubel et al......................29/182.1 X |
| 2,729,880 | 1/1956 | Miller................................29/182.1 |
| 2,976,598 | 3/1961 | Creutz....................................264/65 |
| 3,178,807 | 4/1965 | Bergmann ........................29/182.8 X |
| 3,378,498 | 4/1968 | Weatherley ......................29/182.1 X |

*Primary Examiner*—Edward G. Whitby
*Attorney*—Harry M. Saragovitz, Edward J. Kelly and Herbert Berl

[57] ABSTRACT

A method for forming metal-filled ceramics of near theoretical density comprising the positioning of a ceramic compact in a vacuum chamber together with a quantity of the filler metal. The chamber is heated above the melting point of the metal and evacuated to a vacuum pressure of less than $10^{-6}$ torr. The vacuum removes the oxide film on the surface of the molten metal, thereby permitting the metal to flow freely into the ceramic void spaces.

7 Claims, No Drawings

METHOD FOR FORMING METAL-FILLED CERAMICS OF NEAR THEORETICAL DENSITY

This invention relates to a method for forming metal-filled ceramics of near theoretical density.

Metal-filled ceramics have been investigated for use in lightweight personnel armor. For this application, it is important that the metal substantially fill the void spaces in the ceramic in that free void spaces in excess of around 5 percent by volume, for example, seriously inhibit the ability of the ceramic armor to reset fractures when struck by a projectile. Metal-filled ceramics are usually made by sintering a compacted mixture of metal and ceramic powder. The oxide film present on the surface of the metal powder prevents the metal from "wetting" the ceramic during the sintering operation. The metal is thus unable to completely fill the void spaces. Free void space in the resulting material is about 10–15 percent, i.e., a material 85–95 percent of theoretical density.

Utilizing the present method, an improved metal-filled ceramic having only about 3 percent free void space by volume, i.e., a material 97 percent of theoretical density, is obtained. The material is prepared by pressing a powder to form a compact of the desired shape. The compact is then positioned in a vacuum chamber together with a quantity of the filler metal. The chamber is heated above the melting point of the metal under a vacuum pressure of less than $10^{-6}$ torr. A range of less than $10^{-6}$ torr to about $10^{-9}$ torr was found operable. The vacuum removes the oxide film from the surface of the molten metal, thereby permitting the metal to flow into and completely fill the voids in the ceramic.

It is an object of the present invention to provide and disclose a method for the production of metal-filled ceramics of near theoretical density.

It is a further object of the invention to provide and disclose improved metal-filled ceramics of near theoretical density.

Other objects and a fuller understanding of the invention may be had by referring to the following description and claims:

The invention can best be described by way of a specific example of the preparation of a metal-filled ceramic although its scope is not intended to be limited to the disclosed ingredients.

EXAMPLE

Eighteen hundred grams of boron carbide powder (a 7:3 mixture of 53–74 micron and 1–5 micron $B_4C$ powders, respectively) were isostatically pressed at 50,000 psi for 1 hour at room temperature to form a compact 6 inches long and 3 inches in diameter. The compact was placed in an aluminum oxide crucible together with 500 grams of aluminum powder (5–20 micron particle size). The packed crucible was then placed inside a stainless steel vacuum chamber which was heated to 580°C and continuously evacuated for a period of 24 hours in order to allow the contents of the crucible to outgas. During the course of the following 24 hours, the temperature was slowly raised past the melting point of aluminum (660°C) in order to permit the molten metal to outgas. The chamber was held at 900°C and $10^{-7}$ torr for a period of 1 hour. A temperature equal to about 1.5 times the melting point of the metal has been found operable. To aid the molten aluminum in flowing into the ceramic void spaces, the chamber was back-filled with 15 psi of argon while maintaining the temperature at 900°C. The chamber was then cooled slowly for a period of four hours to room temperature. The excess aluminum enclosing the compact was machined off, and the density of the aluminum filled boron carbide was measured as 2.49 gm/cc. This corresponds to 97 percent of theoretical density. The aluminum content was estimated as between 35 to 40 percent by volume.

Metal-filled ceramics were prepared utilizing ceramics selected from the group consisting of boron carbide, aluminum oxide and beryllium oxide in combination with a metal having a density of less than 9 gm/cc. For example, boron carbide was utilized in combination with a metal selected from the group consisting of aluminum, magnesium, nickel and chromium; and aluminum oxide and beryllium oxide were utilized in combination with a metal selected from the group consisting of aluminum, beryllium, magnesium, titanium, vanadium, nickel and chromium. It was found that the utilization of a vacuum of between $10^{-2}$ to $10^{-6}$ torr resulted in poor wetting of the ceramic by the molten metal. Therefore the molten metal did not flow freely into the ceramic void spaces. However, when the pressure was reduced to less than $10^{-6}$ torr, wetting improved, and the molten metal flowed freely into the ceramic void spaces. Apparently when the mean free path of the oxide molecule is increased beyond a certain value, the evaporation-deposition equilibrium is tipped in favor of oxide evaporation from the metal surface. The oxide-free metal is then able to readily flow into and fill the void spaces in the ceramic.

Although I have described my invention with a certain degree of particularity, I wish it to be understood that I do not desire to be limited to the exact materials and method of preparation shown and described, for obvious modifications will occur to a person skilled in the art.

Having described my invention, I claim:

1. A metal-filled ceramic of about 97 percent theoretical density composed of beryllium oxide and a metal selected from the group consisting of aluminum, beryllium, magnesium, vanadium, nickel and chromium.

2. A metal-filled ceramic in accordance with claim 1 wherein the metal is aluminum.

3. A metal-filled ceramic in accordance with claim 1 wherein the metal is beryllium.

4. A metal-filled ceramic in accordance with claim 1 wherein the metal is magnesium.

5. A metal-filled ceramic in accordance with claim 1 wherein the metal is vanadium.

6. A metal-filled ceramic in accordance with claim 1 wherein the metal is nickel.

7. A metal-filled ceramic in accordance with claim 1 wherein the metal is chromium.

* * * * *